United States Patent Office 3,553,268
Patented Jan. 5, 1971

3,553,268
PROCESS FOR PREPARING ANILINE
Jack M. Solomon, West Caldwell, and Bernard R. Bluestein, Glen Rock, N.J., assignors to Witco Chemical Company, Inc., New York, N.Y., a corporation of Delaware
No Drawing. Filed June 6, 1968, Ser. No. 734,876
Int. Cl. C07c 85/06, 85/08
U.S. Cl. 260—581      6 Claims

ABSTRACT OF THE DISCLOSURE

Process for preparing aniline from cyclohexanone or mixtures thereof with cyclohexanol by passing the same, together with ammonia, in the vapor phase at atmospheric pressure, over a heated nickel on kieselguhr (or other inert carrier) catalyst.

---

Our invention is directed to an improved process for preparing aniline from cyclohexanone or from mixtures of cyclohexanone with cyclohexanol.

Processes for the preparation of aniline from cyclohexanone by reaction with ammonia in the presence of a catalyst have heretofore been disclosed, U.S. Pat. No. 3,219,704 showing various catalysts including platinum, palladium, Raney nickel, Raney cobalt, copper chromite, metal catalysts supported on charcoal, asbestos, alumina, pumice, kieselguhr, silica gel and barium sulfate, activated charcoal, activated alumina, silica gel and magnesite, the platinum metals being stated to be particularly useful and preferred. Using 5% palladium on carbon as the catalyst, said patent shows, in Example 2 thereof, a reaction of cyclohexanone with ammonia, under superatmospheric pressure, at a temperatures of 160° C. (320° F.) for a period of 6 hours to produce a yield of 30% aniline, formed together with N-cyclohexylaniline, dicyclohexylamine and phenol.

The process of our present invention has a number of advantages in that it produces excellent yields of aniline and which are easily recoverable from the reacted mixture, it is carried out at atmospheric pressure, and the catalyst which is utilized, which is nickel on an inert carrier, such as kieselguhr, is readily prepared and is economical in cost.

The starting cyclohexanone can be prepared in any of several manners, which are well known in the art. Thus, for example, mixtures of cyclohexanol can be and most desirably are prepared by the oxidation of cyclohexane in the liquid phase by molecular oxygen, particularly air, as shown, for instance in U.S. Pats. Nos. 2,223,494 and 2,557,281. The unreacted cyclohexane and other byproducts are removed by known procedures. The cyclohexanol may be removed so as to produce a substantially pure cyclohexanone or, if desired, the starting material or feedstock for our process may comprise mixtures of cyclohexanol and cyclohexanone as commercially produced in which the content of cyclohexanol and cyclohexanone is commonly approximately equal or, in certain cases, said mixtures contain on the order of about 55% by weight of cyclohexanol and about 45% of cyclohexanone. Mixtures of cyclohexanone with various other percentages of cyclohexanol can be utilized as starting materials in the practice of our invention but the content of the cyclohexanol should not exceed about 65%.

The nickel on inert carrier catalyst can be prepared in various ways which are well known to the art. The nickel content should be at least about 20% and advantageously constitutes from about 40 to 65%, by weight, of the catalyst, but it is especially desirable that the nickel content constitute about 58%. The nickel is carried on an inert support as, for example, kieselguhr, gamma alumina, pumice, asbestos and silica gel. Particularly preferred is kieselguhr. One illustrative procedure for producing a suitable nickel catalyst is as follows:

Nickel nitrate is dissolved in a minimum amount of distilled water to which is added an amount of kieselguhr such that the final catalyst product contains about 42% by weight of kieselguhr. The mixture is stirred and heated to dryness and the powdered residue is shaped into ⅛″ tablets and calcined in the presence of air at 600° F. for 2 to 4 hours.

The molar ratio of the ammonia, which is employed in the reaction in gaseous form, to the cyclohexanone utilized in the reaction is variable. A molar ratio of at least 1:1 is utilized with a molar ratio well in excess thereof being preferred. Molar ratios in the range of 2:1 to 5:1 are desirable although the molar ratios may be very substantially in excess thereof as, for instance, 10:1 to 20:1 and even much greater. Especially advantageous are molar ratios of 3:1 to 4:1, such as 3.3:1 or 3.5:1.

The contact times between the reaction mixture and the catalyst are variable but, in general, are of short duration, generally in the range of 1 to 30 seconds. In most cases, contact times of from about 15 to 25 seconds are satisfactory, with about 17 to 20 seconds being particularly desirable, depending, however, on the specific activity of the catalyst and the temperature at which the reaction is carried out. Reaction temperatures will, in the usual case, range from about 400° and, advantageously from about 550 to 625° F. with about 600° F. being substantially optimum in most cases. Unreacted material can, of course, be recycled.

The following examples are illustrative of the practice of the process of our invention but are not to be construed in any way as limitative thereof since various changes may be made in the light of the guiding principles and teachings contained herein.

EXAMPLE 1

Cyclohexanone is vaporized and admixed with gaseous ammonia (in a molar ratio of 3:1 of the ammonia to the cyclohexanone) and passed at atmospheric pressure, in a tubular reactor, into contact with a nickel on kieselguhr catalyst (58% nickel on kieselguhr) at a temperature of about 600° F. for a period of about 17 seconds. A yield of about 90% aniline based on the amount of conversion is obtained.

EXAMPLE 2

The process described in Example 1 is carried out except that the feedstock is an about 55% cyclohexanol–about 45% cyclohexanone mixture, the molar ratio of the ammonia to the cyclohexanol-cyclohexanone mixture is 4:1, and the reaction temperature is about 575 to 585° F. A high yield of aniline is obtained.

We claim:
1. A process for the preparation of aniline which comprises passing a member selected from the group consisting of cyclohexanone and mixtures thereof with cyclohexanol, together with ammonia, in the vapor phase at substantially atmospheric pressure and at a temperature of from about 400° F. to about 625° F., over a heated nickel on an inert carrier catalyst.

2. The process of claim 1, in which the temperature is maintained between 550° F. and 625° F.

3. The process of claim 1, in which the molar ratio of the ammonia to the cyclohexanone is in the range of about 3:1 to 4:1.

4. The process of claim 1, in which the inert carrier is kieselguhr.

5. A process according to claim 1, wherein said member is cyclohexanone admixed with up to about 65% by weight of cyclohexanol.

6. The process of claim 3, in which the inert carrier is kieselguhr, the content of nickel in the nickel on kieselguhr catalyst is about 58%, the temperature is about 600° F., and the contact time of the reaction mixture with the catalyst is about 15 to 25 seconds.

References Cited

UNITED STATES PATENTS 2,413,598   12/1946   Ballard et al. _____ 260—581X
3,219,704   11/1965   Wilder et al. _____ 260—578X CHARLES B. PARKER, Primary Examiner R. L. RAYMOND, Assistant Examiner